Figure 1:
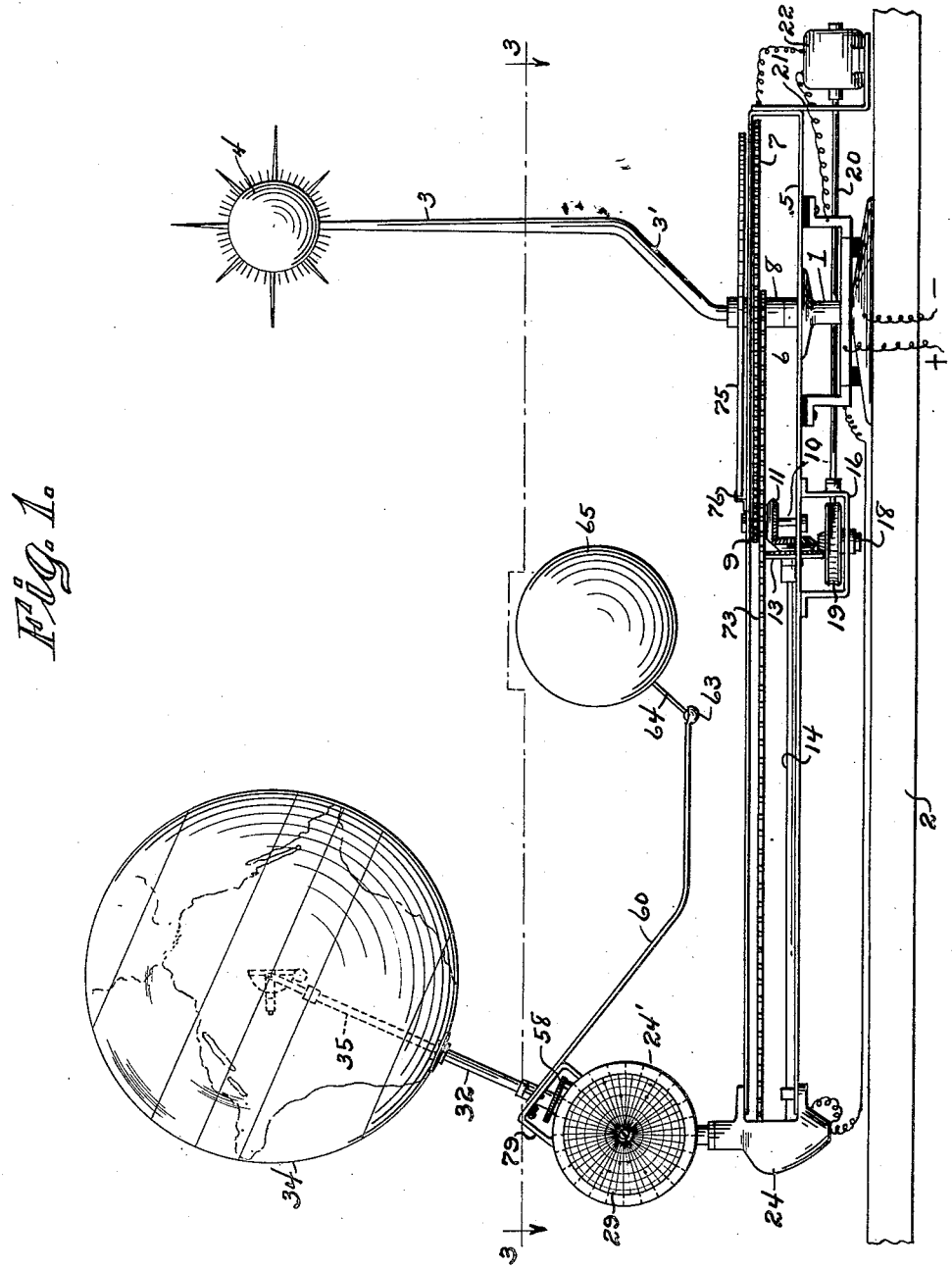

July 14, 1931. H. M. VANDERHIDER 1,814,984
TELLURIAN
Filed Nov. 23, 1928 6 Sheets-Sheet 1

Henry M. Vanderhider
INVENTOR
BY Victor J. Evans
ATTORNEY

WITNESS:

July 14, 1931.    H. M. VANDERHIDER    1,814,984
TELLURIAN
Filed Nov. 23, 1928    6 Sheets-Sheet 2
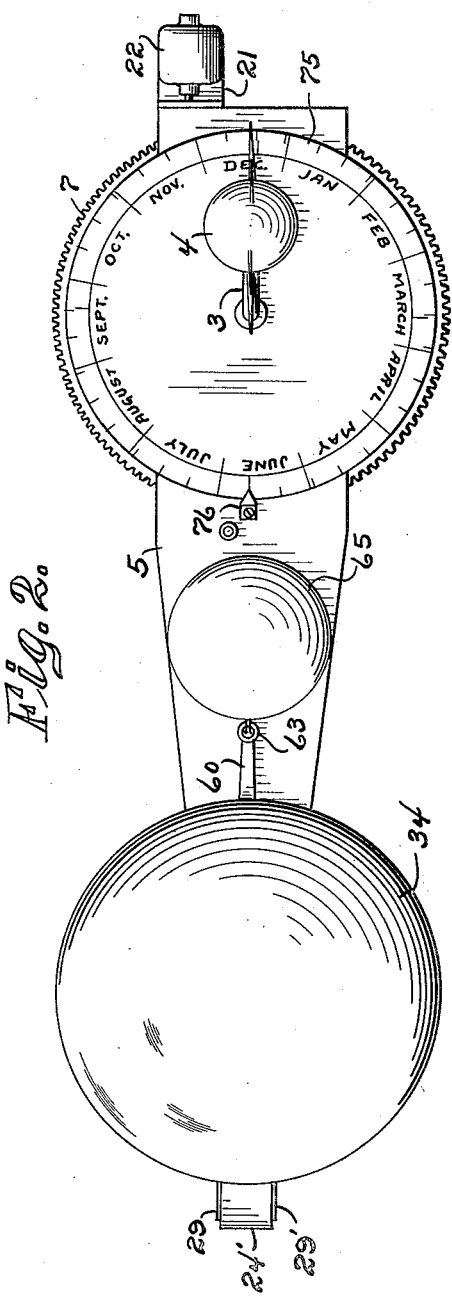
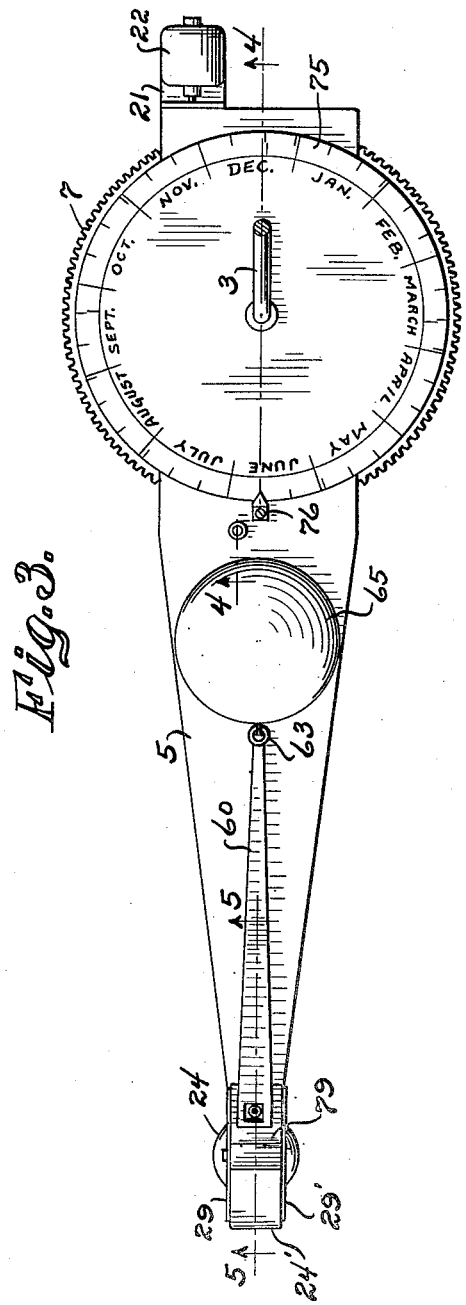

July 14, 1931. H. M. VANDERHIDER 1,814,984
TELLURIAN
Filed Nov. 23, 1928 6 Sheets-Sheet 3
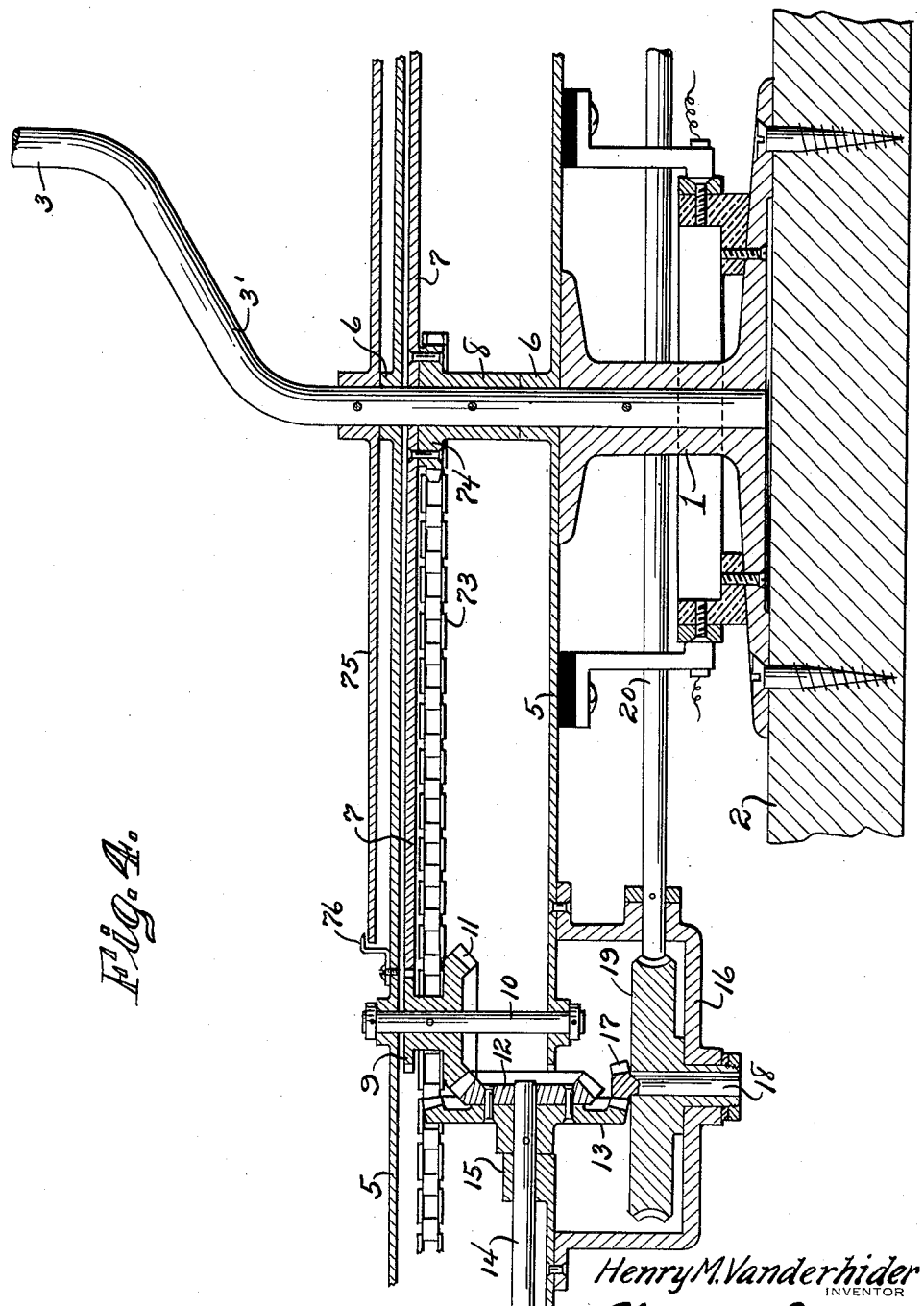

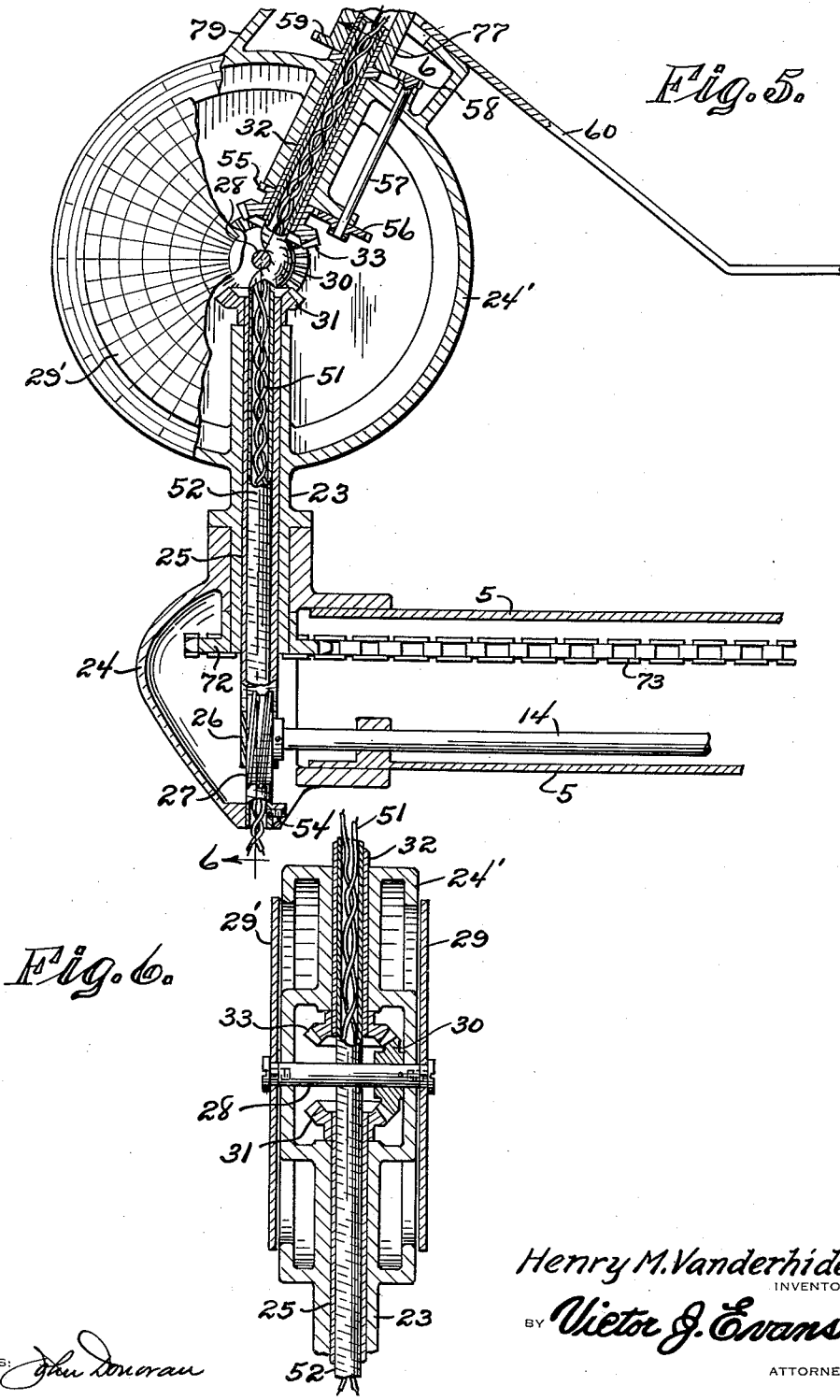

July 14, 1931.  H. M. VANDERHIDER  1,814,984
TELLURIAN
Filed Nov. 23, 1928  6 Sheets-Sheet 5
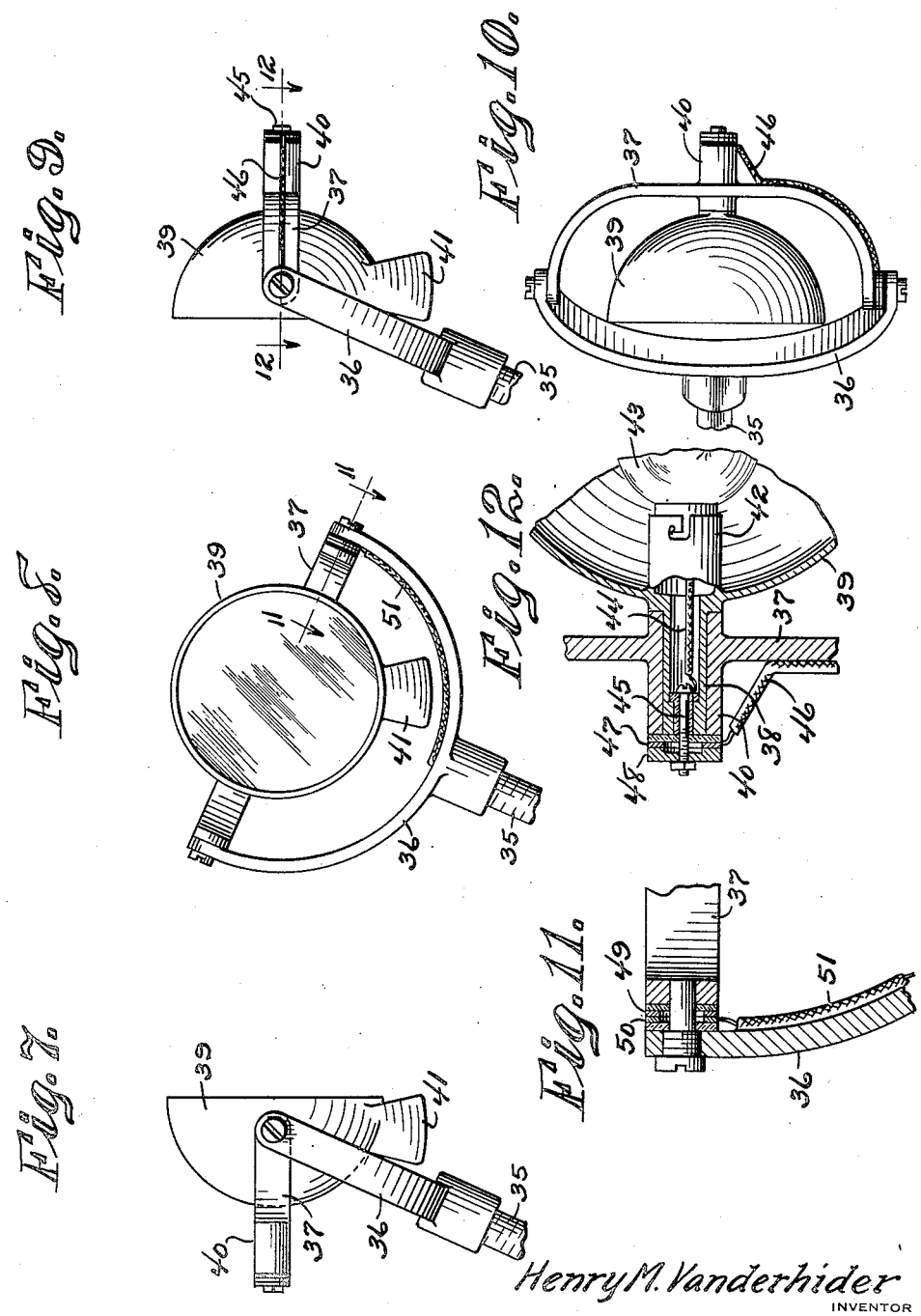

July 14, 1931.  H. M. VANDERHIDER  1,814,984
TELLURIAN
Filed Nov. 23, 1928   6 Sheets-Sheet 6
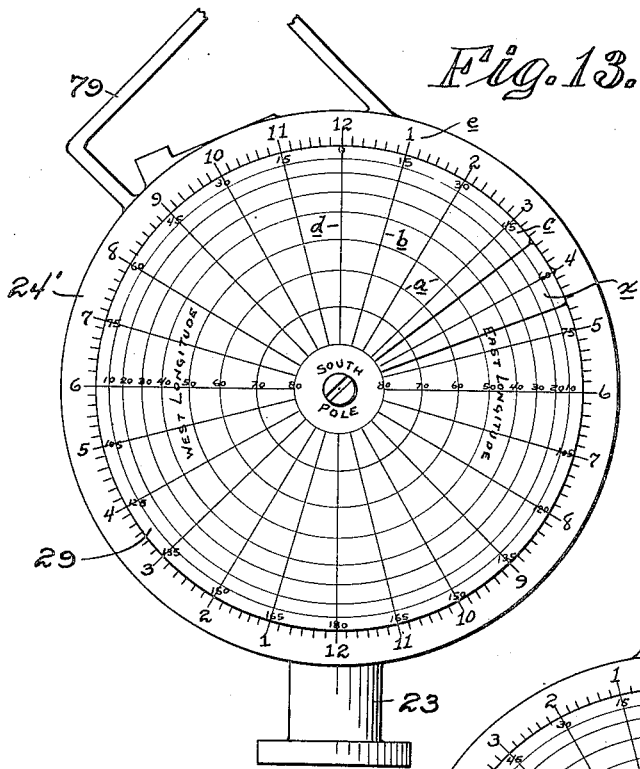
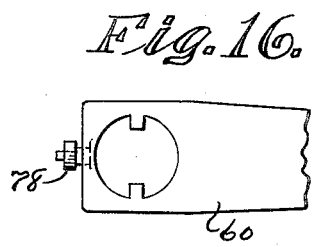
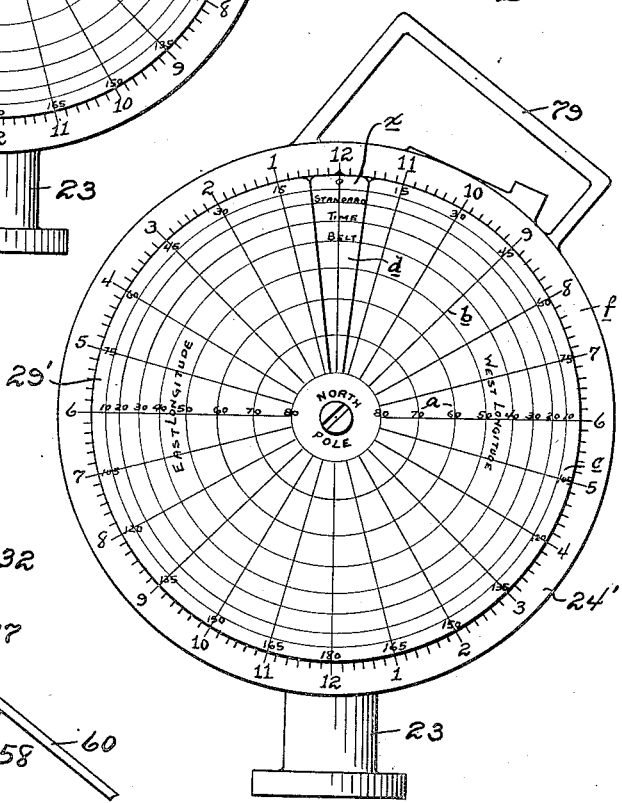
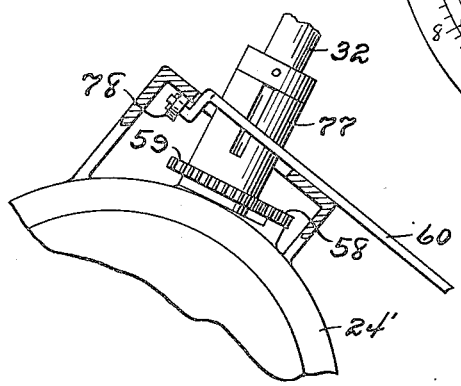
Henry M. Vanderhider
INVENTOR
BY Victor J. Evans
ATTORNEY Patented July 14, 1931

1,814,984

UNITED STATES PATENT OFFICE

HENRY M. VANDERHIDER, OF WESLACO, TEXAS

TELLURIAN

Application filed November 23, 1928. Serial No. 321,384.

This invention relates to means for illustrating the movement of the earth in relation to the sun and moon, the general object of the invention being to provide three spherical members representing the sun, the moon and the earth, with means for rotating the member which represents the earth around its axis while it is moving in a circular path around the sun, while holding the said member on an inclined axis throughout its movement around the sun, with means for rotating the member representing the moon around the earth.

Another object of the invention is to provide a lamp in the member representing the earth which is provided with a reflector so arranged that it will illuminate the member, which is formed of translucent or transparent material.
A further object of the invention is to provide disks suitably rotated in relation to the member representing the earth and having thereon indicia representing meridians of longitude, parallels of latitude, degrees of longitude shown at the equator, the Greenwich meridian and names of the principal cities of the earth, with stationary parts adjacent the disks carrying the dial of a clock and figures indicating solar time, one dial representing the northern hemisphere, while the other represents the southern hemisphere.

A further object of the invention is to provide a motor for rotating the various parts.

This invention also consists in certain other features of construction and in the combination and arrangement of the several parts, to be hereinafter fully described, illustrated in the accompanying drawings and specifically pointed out in the appended claims.
In describing my invention in detail, reference will be had to the accompanying drawings wherein like characters denote like or corresponding parts throughout the several views, and in which:—
Figure 1 is an elevation of the device.
Figure 2 is a plan view thereof.
Figure 3 is a section on line 3—3 of Figure 1.
Figure 4 is a section on line 4—4 of Figure 3.

Figure 5 is a section on line 5—5 of Figure 3.
Figure 6 is a section on line 6—6 of Figure 5.
Figure 7 is a view showing how the reflector for the lamp in the member representing the earth is supported, this figure showing the reflector in the position it occupies when the earth sphere is in the position it occupies in Figure 1.
Figure 8 is a front view of the reflector and its supporting means and showing the position of the reflector when the earth sphere has been turned a quarter turn from the position it occupies in Figure 1.
Figure 9 is a view showing the opposite side of the reflector and its supporting means from that shown in Figure 7, and showing the position of the reflector when the earth sphere is moved to the right of the sun sphere.
Figure 10 is a plan view of Figure 9.
Figure 11 is a section on line 11—11 of Figure 8.
Figure 12 is a section on line 12—12 of Figure 9.
Figures 13 and 14 are views showing the arrangement of indicia on the dials and frame.
Figure 15 is a detail view, partly in section, showing the operating means for the moon carrying arm.
Figure 16 is a plan view of the inner end of the moon arm.

In these drawings, the numeral 1 indicates a spool-like supporting member which is fastened to a post 2 and to which is attached a post 3 which supports a sphere 4 which represents the sun, the post being provided with an offset part 3', as shown.

An elongated housing 5 has the bearing parts 6 arranged therein an appreciable distance from one end thereof and these parts rotatably engage the lower part of the post 3, with a part of the housing resting upon the upper flange of the member 1 so that the housing is rotatably supported by the member 1 and the post. A large gear 7 has its hub 8 fastened to the post within the housing and meshes with a small gear 9 fastened to a shaft 10 carried by the housing, a bevel gear 11 being associated with the gear 9 and this gear 11 meshes with a bevel gear 12 connected to a larger gear 13 fastened to the inner end of a longitudinally extending shaft 14 supported by the bearings 15 in the lower part of the housing. This gear 13 extends through an opening in the bottom of the housing 5 into a casing 16 connected with the bottom of said housing and meshes with a small pinion 17 on the upper end of a stub shaft 18 journaled in the casing 16. A worm gear 19 is attached to the shaft 18 and a worm (not shown) on a shaft 20, meshes with the gear 19. This shaft 20 has one end journaled in the housing and its other end in a bracket 21 at the short end of the housing 5 and this other end of the shaft is attached to the shaft of an electric motor 22 which is supported by the bracket. Thus when the motor is in operation, it will rotate the gear 19, the shaft 18 and the pinion 17, and pinion 17 will rotate the gear 13 so that the shaft 14 and the gear 12 are rotated and gear 12 will rotate the gear 11 so that gear 9 will be caused to travel around the stationary gear 7 so that the housing 5 and the parts carried thereby will rotate on the post 3 and the support 1.

A vertically arranged hollow shaft 23 is journaled in a casing 24 attached to the end of the long part of the housing 5 and a frame 24' of circular shape is formed with or attached to the upper end of said shaft. A hollow post 25 passes through the shaft 23 and has a worm gear 26 on its inner end which engages a worm 27 on the outer end of the shaft 14 which is driven from the motor, as before described.

A shaft 28 passes through the center of the frame 24 and a disk 29 is fastened to one end of the shaft, and a disk 29' is fastened to the other end. A bevel gear 30 is attached to the shaft 28 and a bevel gear 31 on the outer end of the shaft 25, meshes with this gear 30.

A hollow shaft 32 has its lower end so journaled in the upper part of the frame 24 that said shaft extends obliquely, as shown in Figures 1 and 5. The lower end of the shaft 32 has attached thereto a bevel gear 33 which meshes with the gear 30. A spherical member 34 is attached to the upper end of the shaft 32, this member representing the earth. A stationary tube 35 extends upwardly from the upper end of the shaft 32, with its upper end extending to a point adjacent the center of the globe or sphere 34 and a yoke 36 is attached to this end of the tube. A second yoke 37 has its ends pivotally connected with the ends of the yoke 36 and the stem 38 of a reflector 39 is rotatably supported in a boss 40 formed at the center of the yoke 37. A weight 41 is attached to the lower part of the reflector and tends to hold the reflector in a certain position during the movements of the other parts.

The reflector carries the usual socket 42 for the lamp bulb 43 and the conductor 44 from the socket is connected to the terminal 45 in the stem of the reflector which is connected with a conductor 46 by the ring 47 and cap 48 so that the reflector can move without breaking the electrical connection. The conductor 46 is connected with a ring 49 carried by one of the pivotal connections between the two yokes and this ring is in engagement with a second ring 50 in said connection to which a conductor 51 is connected. This conductor 51 and the conductor which is connected with a part to which the lamp is grounded, are enclosed in the usual casing 52 which passes through the tube 35 and through the hollow shafts 32 and 25. I may stiffen the upper part of this casing 52 to form the tube 35. The lower end of the casing 52 passes through the lower end of the casing 24 to which it is attached, as shown at 54, the conductors passing from the tube 52 to a source of current.

A gear 55 is formed with the gear 33 and meshes with a gear 56 on a shaft 57 journaled in the frame 24' and passing through the upper part of said frame. The upper end of the shaft has attached thereto a pinion 58 which meshes with a gear 59 formed on the lower end of a sleeve 77 rotatably supported on the shaft 32. An arm 60 is keyed to the sleeve 77 and has a roller 78 on its short end which rolls on a part of a casing 79 forming a part of the frame 24' and enclosing the gears 58 and 59 and part of the sleeve. A post 64 has a ball at its lower end frictionally engaging the socket 63 at the free end of the arm 60, and a spherical member 65 is attached to the upper end of the post 64, this member representing the moon.

A sprocket 72 is attached to the lower end of the shaft 23 and a chain 73 passes over this sprocket and over a stationary sprocket 74 formed on the hub 8 of the stationary gear 7. A disk 75 is fastened to the post 3 and rests upon the bearing part 6 on the top of the housing 5, this disk having its periphery divided into the twelve months of the year and each month may be divided into weeks and days. A pointer 76 is attached to the top of the housing and cooperates with the disk.

The center of the dial 29 represents one pole of the earth, this dial carrying the degrees of longitude and parallels of latitude and the number of meridians on which are located the principal cities of the world. The parallels of latitude are shown at $a$, the meridians of longitude are shown at $b$, the degrees of longitude at the equator are shown at $c$ and the Greenwich meridian, from which is taken the east and west longitude, is shown at $d$. The dial 29' is the same as dial 29, one dial representing the northern hemisphere and the other dial the southern hemisphere. One face of the frame 24 carries the indications e which are the same as on a clock dial and the other face of the frame carries the indications f indicating solar time. These indications are arranged in rings beyond the peripheries of the disks or dials 29 and 29'.

A standard time belt x may be placed on each disk or dial representing a hemisphere, as shown in Figures 13 and 14. This belt points to the clock dial and will show the standard time by said dial of all places lying within the belt. The individual meridian of any certain place lying in this belt points out its individual solar time on the solar time dial. Meridian lines may be placed on each hemisphere dial in red and intermediate the meridian lines shown thereon. These intermediate meridians will pass through places or cities where standard time changes.

It will thus be seen that when the motor is in operation, the housing will be revolved around the lower part of the post 3 through means of the gear 9 revolving around the stationary gear 7 so that the earth and moon move in a circular path about the sun, though due to the upper part of the post 3 being offset from its lower part, the path is eccentric with the sun. At the same time the earth is rotating on its axis through means of the shaft 14 rotating the hollow shaft 25 and the connections between this shaft 25 and the shaft 32 which carries the earth, the gearing being so arranged that for every revolution of the earth about the sun, the earth will make 365¼ rotations on its axis. During the revolution of the earth around the sun, the shaft 32 remains at the same angle with relation to the sun as it occupies in Figure 1, as shown in Figures 7, 8 and 9, though the reflector changes its position, due to the weight 41, so that that part of the earth is illuminated which faces the sun throughout the revolution of the earth around the sun.

The shaft 32 is caused to remain in the same relative position during the revolution of the earth about the sun through means of the chain and sprockets which connect the shaft 23 carrying the frame 24 with the hub 8 of the stationary gear. The moon is also caused to revolve around the earth through means of the gears 55 and 56, the shaft 57, the pinion 58 and the gear 59 and the sleeve 77 to which the arm 60 which supports the post of the moon is connected.

Thus the movement of the earth on its axis, its revolution about the sun and the revolution of the moon about the earth and the illumination of the earth by the sun are clearly illustrated by this device. In addition, the dial 75 and pointer 76 will indicate the months, weeks and days during the revolution of the earth around the sun and the dials 29 and 29' can be used for ascertaining the degrees of longitude and latitude of the principal cities of the world and their relation to the time of day, as indicated by clock time or solar time, as these dials are rotated at the same speed that the earth rotates about its axis.

The moon standard can be set at the proper angle through means of its ball and socket connection with the arm 60.

What I claim is:—

1. In a device of the character described, a base including a vertically arranged flanged hub-like portion, a post rising from the base and passed through said member and offset at its upper end, a spherical member on said post representing the sun, an elongated housing rotatably supported on said post and reposing upon the flange of the hub-like member, a stationary gear carried by the housing, motor operated means including a gear meshing with the stationary gear to rotate the housing about said post, a casing formed by one end of the housing, an annular frame supported by and above said casing and including inwardly directed bearings, a motor operated shaft journaled in said casing, a vertically disposed driven shaft journaled in the casing and in one of the bearings of said frame and operated by the last mentioned shaft, an additional shaft arranged above and at an angle with relation to said vertical shaft, and journaled in the other bearing of said frame, gearing supported by said frame and providing a connection between the last mentioned shafts for simultaneous rotation thereof, a spherical member carried by the angularly disposed shaft and representing the earth, a laterally extending arm supported by the angularly disposed shaft for rotation, and a spherical member carried by said arm and representing the moon.

2. In a device of the character described, a base, a post rising therefrom, a spherical member supported by the post and representing the sun, an elongated housing rotatably supported on the base and post, a casing formed by one end of the housing, an annular frame supported by and arranged above the casing, a vertical shaft in said casing and extended within said frame, an obliquely disposed shaft arranged in end to end relation with the vertical shaft and journaled in said frame, bevel gearing carried by the adjacent ends of the last mentioned shafts, a transverse shaft journaled in said frame, a gear carried by the last mentioned shaft and meshing with said bevel gearings, motor operated means for rotating said housing and including a shaft for rotating said vertical and obliquely disposed shafts, a spherical member carried by the obliquely disposed shaft and representing the earth, a sleeve rotatably supported upon said obliquely disposed shaft, a laterally extending arm carried by the sleeve, a spherical member supported by the arm and representing the moon, a gear carried by the lower end of the obliquely disposed shaft, a pinion meshing with said gear, a shaft supporting the pinion and journaled in said frame, a second pinion carried by the upper end of the last mentioned shaft, and a gear formed on the lower end of said sleeve and meshing with the last mentioned pinion whereby the sleeve is rotated incident and relative to the rotation of said obliquely disposed shaft.

3. In a device of the character described, a base, a post rising therefrom, a spherical member supported by the post and representing the sun, an elongated housing rotatably supported by the base and post, motor operated means for rotating said housing, a vertically disposed hollow shaft supported by said housing and including an obliquely disposed upper portion, means operated from the motor for rotating said shaft, a spherical member supported by the obliquely disposed portion of the shaft and representing the earth, a stationary tube extending from the obliquely disposed portion and terminating within the spherical member representing the earth, a yoke supported by the end of said tube, a lamp reflector arranged within said spherical member and including a centrally located stem, a second yoke pivoted on the ends of the first mentioned yoke and including a boss located to receive the stem of the reflector, a weight depending from the reflector to maintain the latter in proper position with relation to the said spherical member incident to the rotation thereof, a laterally extending arm supported by the obliquely disposed portion of the shaft for rotation, means for rotating said arm, and a spherical member supported by the arm and representing the moon.

In testimony whereof I affix my signature.

HENRY M. VANDERHIDER.